Figure 1:
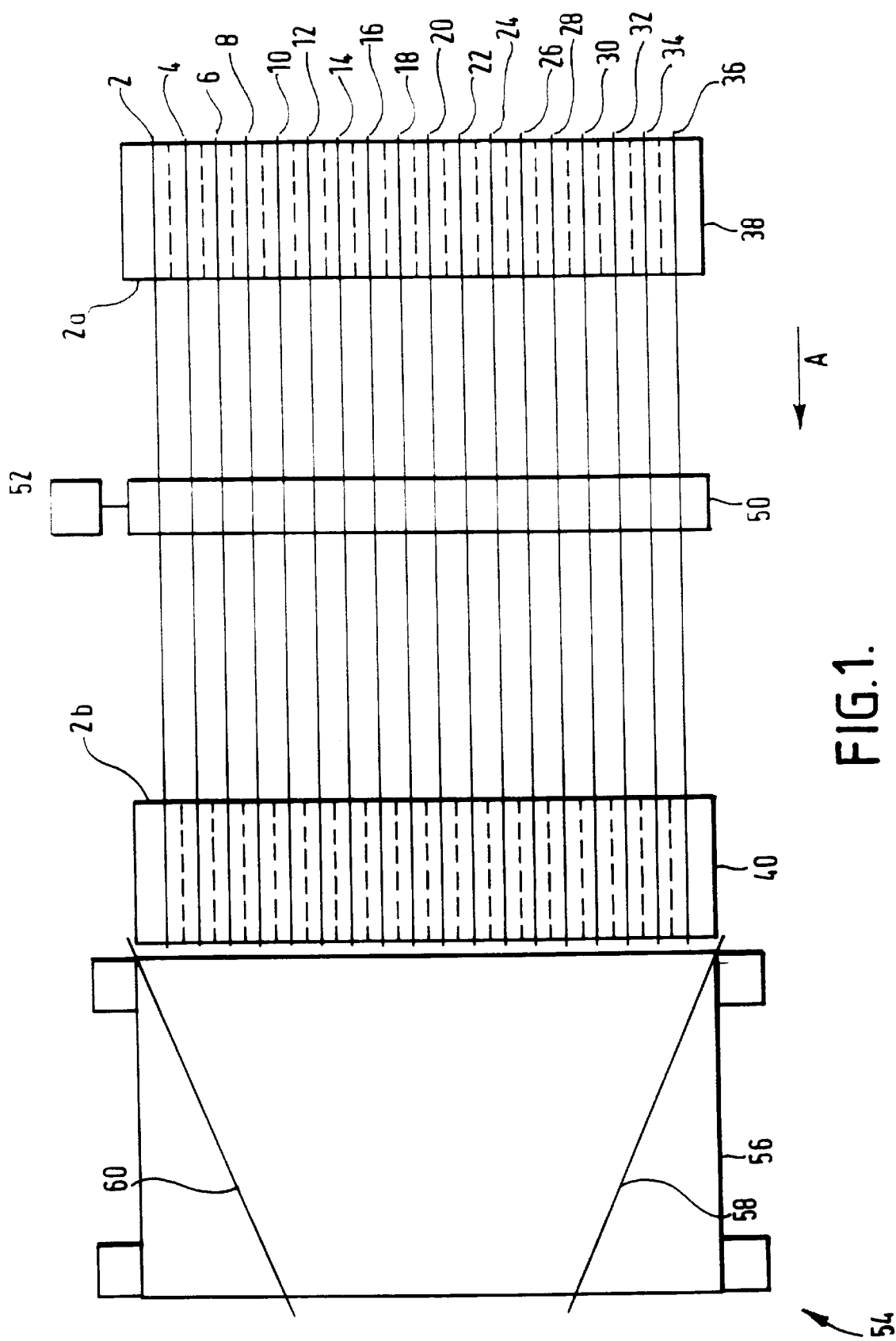

United States Patent [19]
Fenlon

[11] Patent Number: 6,105,756
[45] Date of Patent: Aug. 22, 2000

[54] CONVEYOR AND CONVERGER INCORPORATING A CONVEYOR

[75] Inventor: Christopher Fenlon, Bristol, United Kingdom

[73] Assignee: Testamatic Limited, Bristol, United Kingdom

[21] Appl. No.: 09/029,269

[22] PCT Filed: Aug. 15, 1996

[86] PCT No.: PCT/GB96/01995

§ 371 Date: Feb. 23, 1998

§ 102(e) Date: Feb. 23, 1998

[87] PCT Pub. No.: WO97/08084

PCT Pub. Date: Mar. 6, 1997

[30] Foreign Application Priority Data

Aug. 24, 1995 [GB] United Kingdom ............... 9517310

[51] Int. Cl.[7] ............................................. B65G 23/04
[52] U.S. Cl. ............................................. 198/835; 198/817
[58] Field of Search .................................. 198/817, 453, 198/835, 781.09, 834, 371.2

[56] References Cited

U.S. PATENT DOCUMENTS

| | | | |
|---|---|---|---|
| 859,595 | 7/1907 | Camp | 198/371.2 |
| 1,332,866 | 3/1920 | Emerson | 198/835 |
| 1,431,488 | 10/1922 | Reed | 198/817 |
| 1,791,835 | 2/1931 | Nyborg et al. | 198/835 |
| 2,979,186 | 4/1961 | Sehn et al. | 198/817 |
| 3,003,249 | 10/1961 | Templeton | 198/817 |
| 3,088,581 | 5/1963 | Rostal | 198/817 |
| 4,004,677 | 1/1977 | Heier et al. | |
| 4,105,398 | 8/1978 | Disch et al. | 198/453 |
| 4,730,718 | 3/1988 | Fazio et al. | 198/817 |
| 5,168,978 | 12/1992 | Cox et al. | 198/817 |

FOREIGN PATENT DOCUMENTS

| | | |
|---|---|---|
| 0146496 | 6/1985 | European Pat. Off. |
| 1186402 | 1/1965 | Germany |
| 2136680 | 2/1973 | Germany |
| 2273692 | 6/1994 | United Kingdom |
| 8807969 | 10/1988 | WIPO |

Primary Examiner—Christopher P. Ellis
Assistant Examiner—Joe Dillon, Jr.
Attorney, Agent, or Firm—Michael J. Ram; Koppel & Jacobs

[57] ABSTRACT

A conveyor is provided in which the belt or a plurality of bands (2–36) forming a composite belt extend between free running guide rollers (38, 40). A. Drive shaft (50) runs adjacent the belt or bands and one or more pinch wheels are movable by actuators to cause the belt or bands to be driven from the drive shaft.

12 Claims, 3 Drawing Sheets

CONVEYOR AND CONVERGER INCORPORATING A CONVEYOR

The present invention relates to a conveyor and to convergers incorporating a plurality of such conveyors. Such conveyors and convergers are suited for use in a production line.

GB-2224708B discloses a conveyor belt assembly usable as a converger. The conveyor comprises two horizontally spaced rollers, rotatably mounted within a casing. One of the rollers is coupled to a motor and acts as a drive roller, whereas the other is freely rotating. The rollers are linked by a composite conveyor belt formed of a plurality of spaced parallel narrow belt loops. The loops are located in circumferential grooves formed in the rollers and are kept under sufficient tension such that the free running roller is driven from the drive roller. Upwardly pointing fingers are controllable to project through the gaps between adjacent belt loops so as to lift items off the belt loops and thereby prevent the items from being conveyed along the conveyor. Conveyors of this type can be arranged in parallel and controlled so as to delay products emerging from a plurality of production lines so that they can be sequenced into a single conveyor path. The conveyor belts are permanently in motion and this can result in products becoming skewed if they are not lifted completely off the conveyor belt by the fingers.

According to a first aspect of the present invention, there is provided a conveyor, comprising at least one endless conveying means, a drive shaft for driving the at least one conveying means, and drive transfer means associated with a respective endless conveying means and moveable between a drive position for driving the associated conveying means from the drive shaft, and a stop position at which motion of the drive shaft is not transferred to the associated conveying means.

It is thus possible to provide a conveyor arrangement in which the conveyor is stopped in order to prevent the conveyance of an item. However, the motor and associated driving elements continue to run when the conveyor is stopped, thereby ensuring that acceleration and the deceleration of the conveyor are relatively rapid.

Preferably, the endless conveying means is a conveyor belt. The conveyor belt may be a relatively wide single belt, or may be a composite belt formed from a plurality of bands. Advantageously, each belt or band extends between associated guide rollers. The guide rollers carry circumferential recesses thereon so as to locate the belt or band within the recess and thereby to guide it.

Preferably, the drive transfer means comprises one or more pinch wheels moveable by one or more actuators between respective engaged positions, at which the pinch wheels are urged towards contact with the drive shaft, and disengaged positions such that no drive is transferred to the conveyor belt.

Alternatively, the drive transfer means may comprise idler wheels moveable to and from an engaged position at which they abut a drive shaft and a roller over which an associated conveyor belt passes.

Preferably, the pinch (or idler) wheels are moved by pneumatic actuators. Such an arrangement provides a clean and easily controllable source of motive power. Alternatively, hydraulic or electrical actuators may be used.

Preferably, a plurality of conveyors are arranged in parallel and feed a common output conveyor. Such an arrangement forms a converger for converging a plurality of input paths to a single output path. Thus, each of the input conveyors is independently controllable between a moving state for conveying items to the output path, and a stationary state in which an item is not conveyed to the output path.

Preferably, the input conveyors are driven from a common drive shaft or a common motor. A composite conveyor belt may be controlled so as to simulate a plurality of input conveyors arranged side by side.

Advantageously, the or each conveyor belt passes between the respective guide rollers such that the or each belt is kept under moderate tension. This ensures that the or each belt remains captive on its guide rollers. As noted hereinbefore, prior art conveyors have a drive roller and a driven roller. This arrangement precludes the possibility of turning the conveyor by hand during routine maintenance or cleaning. However, the conveyor of the present invention supports the conveyor belt on free running rollers and this enables the belt to be moved by hand during maintenance or cleaning.

According to a second aspect of the present invention, there is provided a method of operating a conveyor, the conveyor comprising an endless conveying means a driving shaft for driving the conveying means, and drive transfer means moveable between a drive position for driving the conveying means and a stop position at which the motion of the driving shaft is not conveyed to the conveying means, the method comprising controlling the position of the drive transfer means so as to move the drive transfer means into engagement with the driving shaft in order to drive the conveying means and to disengage the drive transfer means from the driving shaft in order to halt the conveying means.

Figure 2:
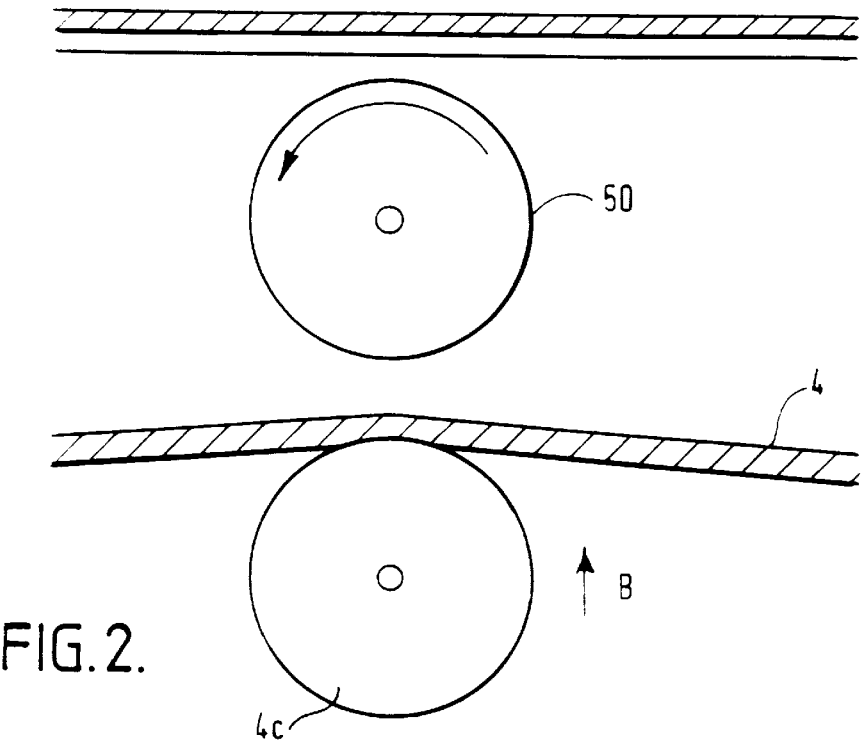
Figure 3:
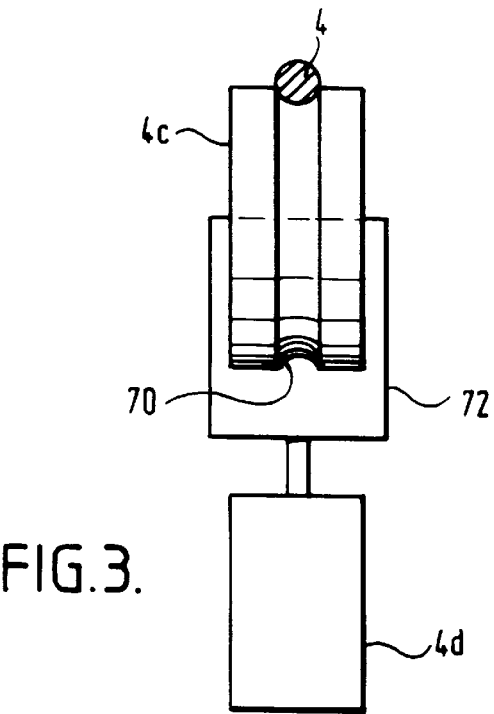
Figure 4:
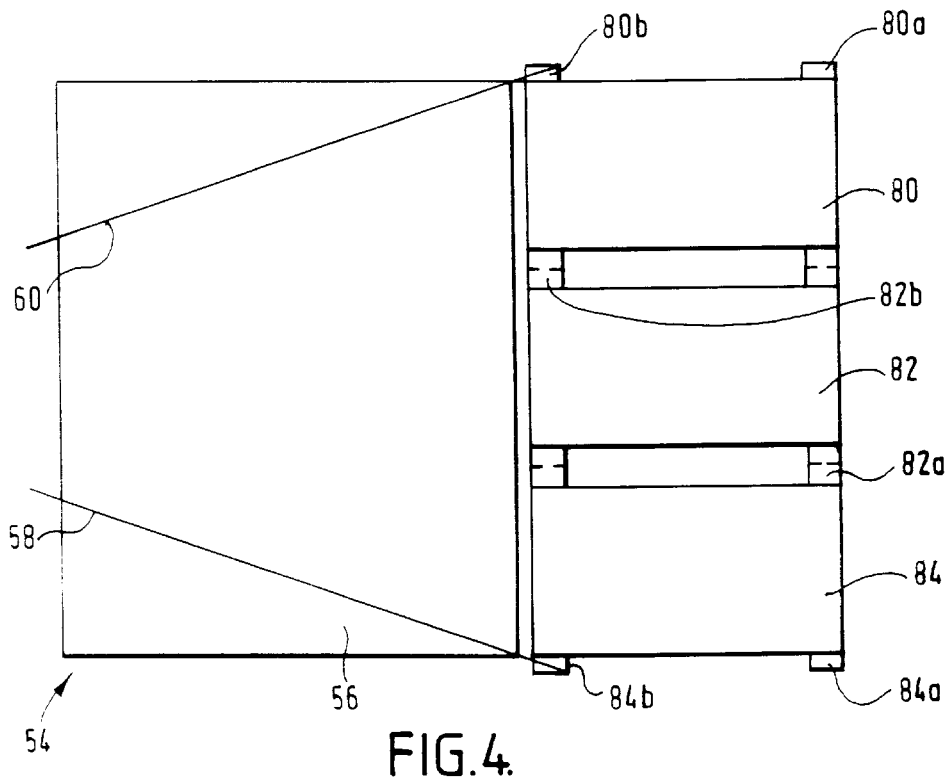
Figure 5:
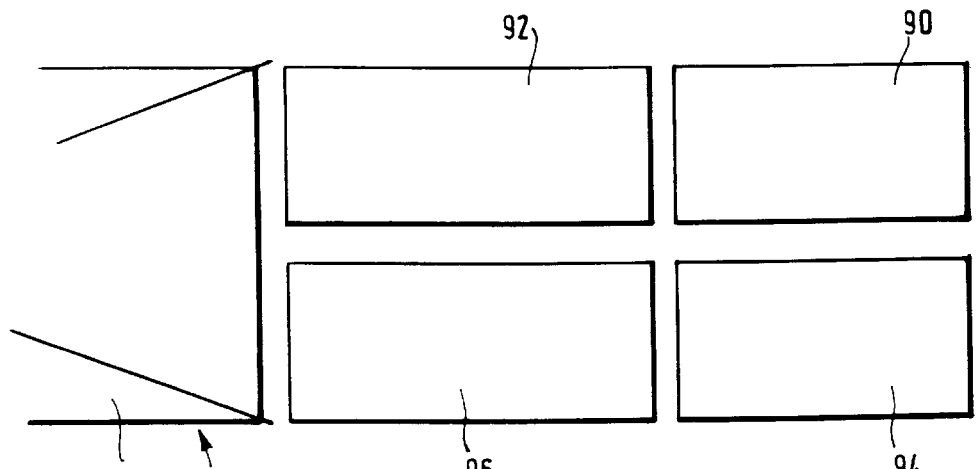

The present invention will further be described, by way of example, with reference to the accompanying drawings, in which:

FIG. 1. is a plan view of a conveyor constituting a first embodiment of the present invention;

FIG. 2. schematically illustrates the drive arrangement for the conveyor shown in FIG. 1;

FIG. 3. shows a further view of the drive arrangement of the conveyor shown in FIG. 1;

FIG. 4. schematically illustrates a fixed three lane converger constituting an embodiment of the present invention; and FIG. 5. schematically illustrates a two lane scheduler.

The conveyor shown in FIG. 1 comprises eighteen belt loops 2 to 36 stretching between first and second composite rollers 38 and 40. Each composite roller is, in fact, formed of a plurality of rollers sharing a common axis of rotation. The first belt loop 2 is supported at the first composite roller 38 by an associated roller 2a, and at the second composite roller 40 by an associated roller 2b. Similarly, the second belt loop 4 is supported by rollers 4a and 4b forming part of the first and second composite rollers 38 and 40, respectively, and so on.

A drive shaft 50 runs adjacent each of the conveyor belt loops 2 to 36. The drive shaft 50 is located substantially in a plane extending between the first and second composite rollers 38 and 40. Thus, the drive shaft 50 extends within the loop formed by each of the conveyor belt loops, as shown in FIG. 2. The drive shaft 50 is continuously driven from a motor, schematically illustrated as item 52 in FIG. 1.

The belt loops are driven such that items placed upon the belt are conveyed along the direction indicated by arrow A towards a converger section 54. The converger section 54 comprises a wide conveyor belt 56 and arms 58 and 60 which define the sides of a funnel.

Each belt loop 2 to 36, has an associated pinch wheel. Thus, the first belt 2 has a pinch wheel 2c, the second belt 4 has a pinch wheel 4c, and so on.

FIG. 2 illustrates the second belt 4 with the pinch 4c thereof in the non-driving position. In order to drive the second belt 4, the pinch wheel 4c is moved upwardly by an actuator 4d along the direction of arrow B. The belt 4 becomes trapped between the drive shaft 50 and the pinch wheel 4c, thereby causing the belt 4 to move in response to rotation of the shaft 50.

FIG. 3 shows the arrangement shown in FIG. 2 when viewed such that the path of the belt 4 extends above and below the plane of the page. The pinch wheel 4c carries a circumferential groove 70 which engages the belt 4 so as to hold it securely against lateral motion. The actuator 4d is arranged to move the pinch wheel 4c upwardly so as to engage the shaft 50. The pinch wheel 4c is carried in a carriage 72 supported by the actuator 4d.

The conveyor shown in FIG. 1 can be used as a converger. Supposing, for example, that three products were delivered simultaneously to the conveyor in the region of the first composite roller 38. The products are dimensioned such that they can all fit on the belt simultaneously side by side without touching one another. The belt can be divided into three lanes such that the 1st to 6th belt loops 2 to 12 cooperate to form a first lane, the 7th to 12th belt loops 14 to 24 cooperate to form a second lane, and the 13th to 18th belt loops 26 to 36 cooperate to form the third lane. When the products arrive simultaneously at the input end of the belt, the 1st to 6th pinch rollers 2c to 12c are moved upwardly by their respective actuators to engage the 1st to 6th belts. The product in lane 1 is therefore conveyed along the belt to the converger section 54. Once the first product has reached the converger section 54, the 1st to 6th pinch wheels 2c to 12c are moved away from the drive shaft 50 and the 7th to 12th pinch wheels 14c to 24c are moved upwardly to engage their respective belt portions with the drive shaft 50 such that they cooperate to move the second package towards the converger portion 54. Once the second package has reached the converger portion 34, the pinch wheels of the 7th to 12th conveyor bands are returned to their non-driving state and the pinch wheels of the 13th to 18th bands 26 to 36 are moved upwardly to engage the 13th to 18th bands with the drive shaft 50 such that the third product is conveyed towards the converger portion 54. Thus, products which arrived at the conveyor simultaneously, leave the conveyor one by one.

The arrangement shown in FIG. 1 may be controlled by a suitable controller, such as a programable data processor, to make 2,3,4 or more independently controllable lanes. However, if it is known that three lanes will be permanently required, then a simplified arrangement as shown in FIG. 4 may be provided.

The arrangement shown in FIG. 4 has three input conveyors 80,82 and 84 feeding a single output conveyor 56. Each of the input conveyors comprises a relatively wide belt which extends between first and second composite rollers. The composite rollers are made up of three cylindrical rollers. Thus, the first conveyor belt 80 is supported upon respective rollers 80a and 80b. Similarly, the second conveyor belt 82 is supported upon respective rollers 82a and 82b, and the third conveyor belt 84 is supported by respective rollers 84a and 84b. The rollers 80a, 82a and 84a share a common axis and form the first composite roller. Similarly, the rollers 80b, 82b and 84b also share a common axis. Each conveyor belt is driven from the drive shaft 50 by a respective pinch wheel, as described with reference to FIGS. 1 and 2. The pinch wheels may be elongate and could be described as pinch rollers.

The conveyor is able to operate with a wide variety of package sizes. In fact the conveyor can even operate properly with packages which are sufficiently long that they must overhang the conveyor. This contrasts with the prior art conveyor disclosed in GB-2224708B where reliable operation could only be ensured if the packages were much smaller than the length of the conveyor so that they could be properly lifted by the fingers of the conveyor.

The belt arrangements as described hereinbefore may also be incorporated within a sequencer. FIG. 5 schematically illustrates a two-lane sequencer. The sequencer comprises two lanes each having two belts which deliver their products to a converger section 54. Products from a production line can arrive at the sequencer from either channel in an asynchronous manner. The first channel of the sequencer comprises belts 90 and 92 arranged in series. The second lane comprises belts 94 and 96 arranged in series. Each belt can either be controlled to convey the product from its input to its output, or may be controlled to hold the product so as to delay its progress towards the converger 54. By suitable monitoring of the position of products within the sequencer and control of the belts, it is possible to delay products in order to ensure that products are delivered to the converger at substantially regular intervals of time. Sequencers are known products, but prior art sequencers typically had independently controllable belts each of which was driven from its own servo motor and therefore these sequencers experienced considerable delays in accelerating the belts. The provision of a servo motor for each belt made the prior art sequencers particularly bulky and relatively expensive. Each of the belts 90 to 96 and the output belt 56 in the converger shown in FIG. 5 can be driven from a single motor. Each of the belts 90 to 96 are driven via an idler wheel or a pinch wheel arrangement as illustrated in FIGS. 2 and 3, whereas the output belt may be driven using a permanently driven end roller or a pinch roller. The sequencer illustrated in FIG. 5 is a relatively simple design and it will be appreciated that more complex sequencers may be provided by providing more channels in parallel and/or more belts in series.

The conveyor described herein is capable rapid acceleration and deceleration. This enables the position of products on the conveyor to be accurately controlled. Such a conveyor may be used to deliver products to a testing station.

The conveyor can also be used in a filling station. The conveyor may convey a package towards a filling station and then be stopped when the package is at the station. The conveyor is controllable such that the package can be indexed past a plurality of filling stations and stopped at each filling station. Furthermore, the position of the package can be controlled such that different products can be placed at different positions within the pack. In such an arrangement, a number of conveyors may be arranged in series such that each filling station is associated with a respective conveyor and the position of the package with respect to a given filling station can be controlled without affecting the positioning of any other package at any other filling station.

Although three-lane convergers and a two-lane sequencer have been described, the number of lanes in each device may be varied. Furthermore a plurality of conveyors can be driven from a single motor.

It is thus possible to provide a compact, reliable and highly controllable conveyor arrangement.

What is claimed is:

1. A conveyor comprising at least one endless conveying means characterized by a drive shaft for driving the conveying means, and at least one drive transfer wheel associated with a respective endless conveying means movable by associated actuators between respective engaged positions at which at least one drive transfer wheel is urged towards contact with the drive shaft for driving the associated conveying means from the drive shaft, and a stop position at which the at least one drive transfer wheel is disengaged from the drive shaft such that motion of the drive shaft is not transferred to the associated conveying means.

2. The conveyor of claim 1, characterized in that the at least one drive transfer wheel is at least one pinch wheel.

3. The conveyor of claim 2, characterized in that the at least one pinch wheel is moved by pneumatic, hydraulic, or electrical actuators.

4. The conveyor of claim 1, characterized in that the at least one drive transfer wheel is at least one idler wheel movable to and from an engaged position at which said at least one idler wheel abuts the drive shaft and a roller over which the associated conveying means passes.

5. The conveyor of claim 4, characterized in that the at least one idler wheel is moved by pneumatic, hydraulic or electrical actuators.

6. The conveyor of claim 1, characterized in that the at least one endless conveying means is at least one belt.

7. The conveyor of claim 6, characterized in that each belt extends betweenassociated guide rollers.

8. The conveyor of claim 7, characterized in that the guide rollers are free running.

9. The conveyor of claim 6, characterized in that the at least one belt is a composite belt formed from a plurality of bands.

10. The conveyor of claim 9, characterized by a plurality of input conveyors arranged in parallel and feeding a shared output conveyor.

11. The conveyor of claim 10, characterized in that the input conveyors share a drive shaft.

12. A method of operating a conveyor, the conveyor comprising an endless conveying means, a drive shaft for driving the conveying means, and at least one drive transfer wheel movable between a drive position for driving the conveying means and a stop position at which motion of the drive shaft is not conveyed to the endless conveying means, the method characterized by controlling the position of the at least one drive transfer wheel so as to move the at least one drive transfer wheel into engagement with the drive shaft in order to drive the conveying means and to disengage the drive transfer means from the drive shaft in order to halt the conveying means.

* * * * *